United States Patent [19]

Krooss

[11] Patent Number: 4,854,442
[45] Date of Patent: Aug. 8, 1989

[54] BOTTLE STAND UP APPARATUS

[76] Inventor: Robert J. Krooss, 105 Lake Dr., Mountain Lakes, N.J. 07046

[21] Appl. No.: 173,078

[22] Filed: Mar. 25, 1988

[51] Int. Cl.$^4$ .................. B65G 47/24; B65G 43/08
[52] U.S. Cl. .................. 198/400; 198/395; 414/768
[58] Field of Search .................. 198/395, 399, 400; 250/223 B; 414/757, 763, 770

[56] References Cited

U.S. PATENT DOCUMENTS

| 1,787,901 | 1/1931 | Gottschalk | 198/399 |
| 3,920,118 | 11/1975 | Krooss | 198/395 |
| 4,208,761 | 6/1980 | Ionescu | 198/400 X |
| 4,271,954 | 6/1981 | Gosney | 198/399 |
| 4,790,423 | 12/1988 | Hegarty et al. | 198/400 |

FOREIGN PATENT DOCUMENTS 2035974 6/1980 United Kingdom ................ 198/400

Primary Examiner—Andres Kashnikow
Assistant Examiner—Timothy Newholm
Attorney, Agent, or Firm—Stephen E. Feldman

[57] ABSTRACT

Bottles are moved along a conveyor between a pair of spaced belts while lying on their sides, and may be in neck leading or base leading orientation. Each bottle is detected individually to determine its orientation. Signals, corresponding to the orientation of the bottle detected are sent to a selector switch which sets up bottle stand up apparatus to act upon the detected bottle. For base leading oriented bottles a bottle trip is positioned in the path of the bottle and, working in coordination with the pair of spaced belts, acts upon the bottle causing the bottle to pivot on itself into a standing position, on its base. For neck leading oriented bottles the bottle trip is removed from the path of the bottle and the bottle makes contact with a rotating wheel which, working in coordination with the pair of spaced belts, acts upon the bottle causing the bottle to arc about itself into a standing position, on its base.

21 Claims, 2 Drawing Sheets

FIG. 3
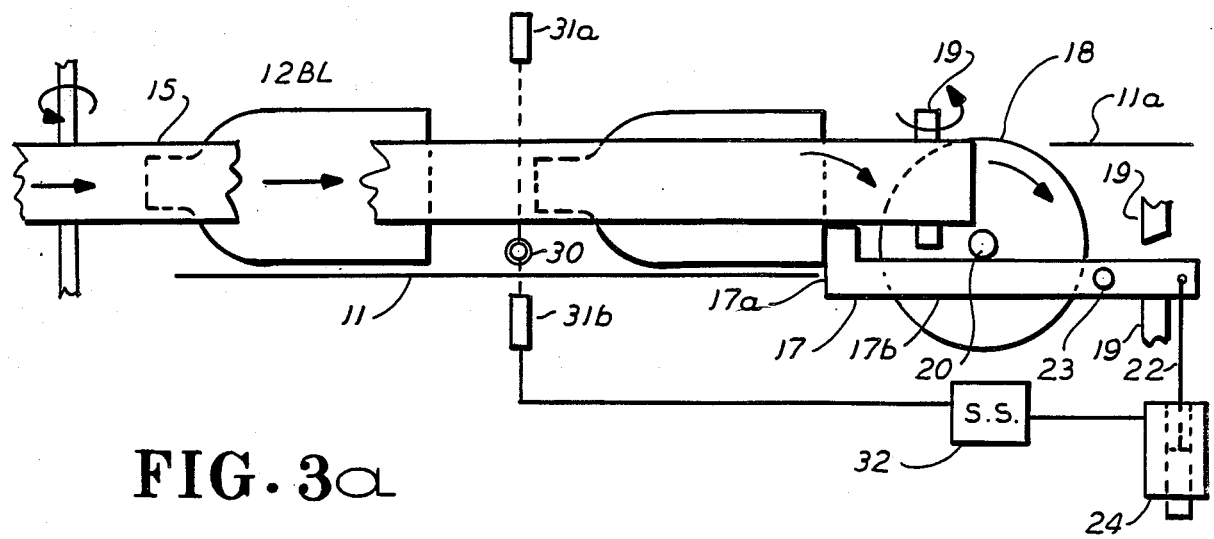
FIG. 3a
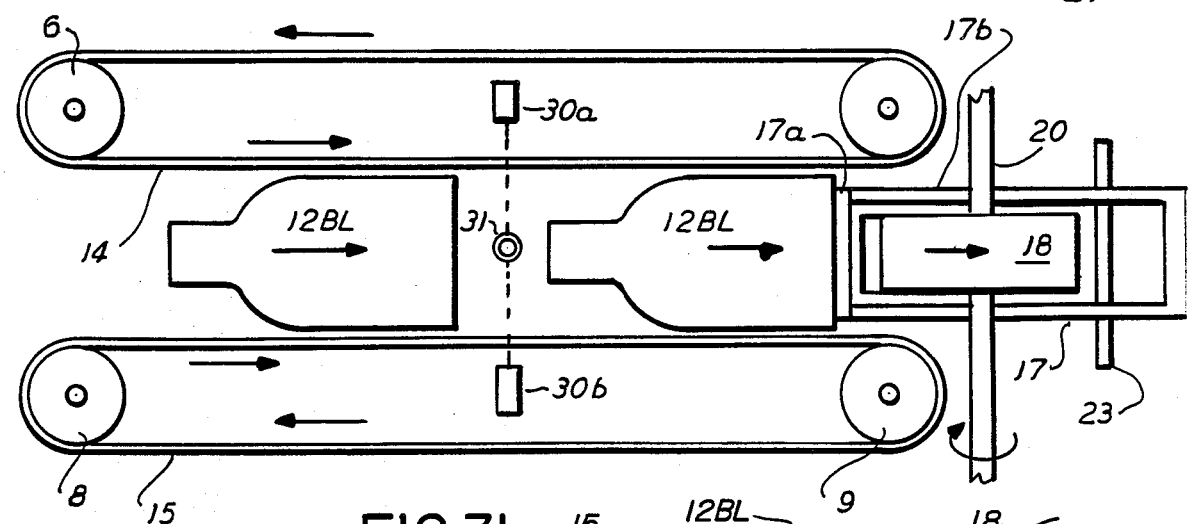
FIG. 3b
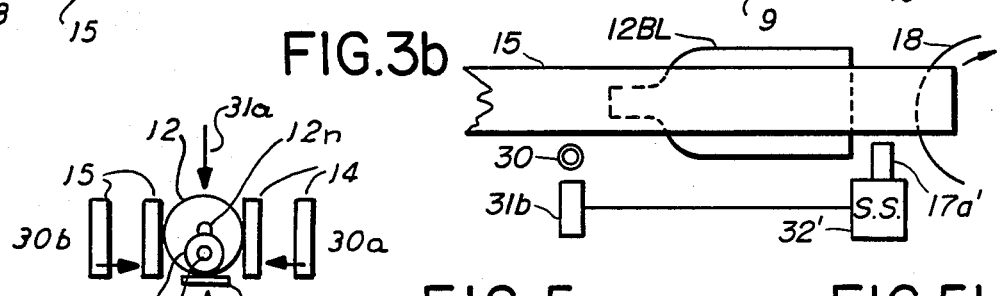
FIG. 4
FIG. 5a
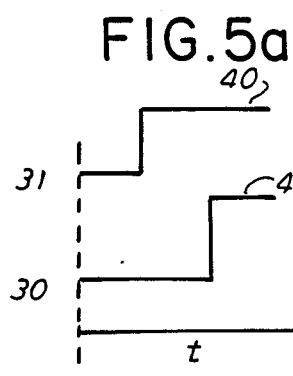
FIG. 5b
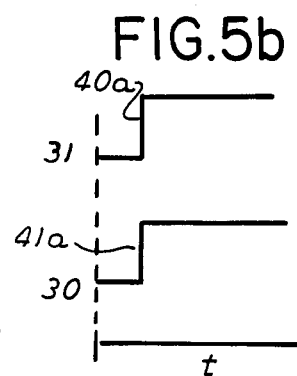

BOTTLE STAND UP APPARATUS

BACKGROUND OF THE INVENTION

(1) Field of the Invention

This invention relates to bottle conveyor systems and apparatus and more particularly to apparatus for uprighting bottles which have been carried along on their sides on the conveyor of a bottle conveyor system.

(2) Prior Art

Most bottle conveyor systems include bottle orientation apparatus for uprighting bottles traveling on the conveyor to an upright position, that is, a position where the bottle is standing on its base. For the most part, when bottles are introduced on to the conveyor apparatus of a bottle conveyor system, the bottles are on their sides, some bottles proceeding along the conveyor in a neck leading position, others in a base leading position. Traditionally, such bottles have been oriented into a standing, upright position, with base down, in several ways.

One approach uses a ramp which engages a moving bottle and applies a torque in one direction to lift the neck of a neck leading bottle and applies a torque in the other direction to drop the base of a base leading bottle. Such bottle orientation system uses the same ramp to orient both neck leading and base leading bottles and a favorable elevation adjustment of the ramp for the orientation of neck leading bottles does not produce a favorable corresponding effect on the orientation of base leading bottles. Thus, a compromise of the elevation adjustment of the ramp is usually reached, reducing the efficiency of the conveyor system.

Another technique provides a trip in the path of a traveling bottle which engages the bottle. The trip co-operates with the moving belts which carry the bottles along. Torque in one direction is exerted on a base leading bottle and torque in the other direction is exerted on a neck leading bottle. With this system the same components are used to effect orientation by torque exerted in different directions so that any adjustment of these components must be a compromise, all with adverse effect on the efficiency of the apparatus.

Examples of conveyor systems which include bottle orientation apparatus can be found in United States Letters Patent, 4,457,421 and 2,316,654.

More advanced bottle stand up apparatus acts upon bottles carried on a conveyor, while lying on their sides, without regard to their neck leading or base leading orientation. The bottles are grasped and carried along by a pair of spaced, moving belts into the bottle stand up apparatus. The bottle stand up apparatus includes a pair of inclined, spaced ramps positioned in the path of the oncoming bottles, with a moving inclined belt positioned between the ramps. The neck of a neck leading bottle is driven by the spaced, moving belts through the space between the ramps, making contact with the moving belt. The moving, inclined belt, in coordination with the spaced belts, acts upon the neck of the bottle and orients the bottle to a standing position.

The space between the inclined ramps is such that the neck of a neck leading bottle will enter the space as the bottle enters the bottle stand up apparatus but the space is not sufficiently wide to permit passage of the base of a base leading bottle through such space.

A base leading bottle makes contact, at its base, with the upper surface of the spaced ramps, and in coordination with the side belts act upon the base of the bottle to orient the bottle to an upright, standing position.

Although the bottle stand up apparatus generally described above is an advancement in the art over the techniques formerly used, this apparatus appears to have an upper operational speed limitation not found in the present invention.

THE PRESENT INVENTION

The present invention is a bottle stand up or base orientation apparatus which may be integrated into a bottle conveyor system for orienting, in a stand up position, bottles as they are conveyed along the conveyor. The bottle stand up apparatus is designed to re-orient bottles from a side or lying down position to an upright, standing position, so that the bottle is standing on its base. This is accomplished at great speed and with minimal interference with the advancement of the bottles along the conveyor system.

The apparatus of the orientation apparatus includes a bottle position detection sub-system which detects the oncoming bottle and determines its orientation on the conveyor, that is, in neck leading position or base leading position and signals a selector which in turn, sets up or prepares the bottle orientation to act upon a neck leading oriented bottle or a base leading oriented bottle before the detected bottle enters the bottle orientation apparatus. The detected bottle is advanced into the stand up apparatus, which is now set up for handling the particular bottle and acts upon the bottle in the most efficient way to orient the particular (either base leading or neck leading) bottle.

The bottle handling apparatus includes a rotating wheel, positioned in the path of the advancing or oncoming bottle for particularly acting upon neck leading bottles so as to re-orient the bottle from a lying down position to a position where the bottle is standing upright on its base. There is also provided a retractable bottle trip mechanism which is in retracted position when the orientation apparatus is set up to receive a neck leading bottle so that the neck leading bottle, when advancing into the bottle orientation apparatus passes the bottle trip mechanism without contact with the same.

When the bottle orientation apparatus is set up or prepared to handle a base leading bottle advancing into the orientation apparatus the bottle trip mechanism is positioned to intercept the base of the bottle as the bottle moves along the conveyor, into the bottle orienting apparatus and, cooperating with the conveyor belts, levers the base leading bottle to a standing position, standing on its base.

The rotating wheel for uprighting neck leading bottles is located down stream in the direction of travel of the bottles from the bottle position detection sub-system, as is the bottle trip mechanism. While the rotating wheel and the bottle trip mechanism are located in down stream order, one following the other.

In its preferred form the bottle position detection subsystem includes a set of photo detectors or electric eye sensing devices positioned to detected each bottle individually as it advances to the orientation apparatus, just prior to the actual orientation process. One photo detector is positioned centrally over the base plate of the conveyor having the center line from the neck to the base as its target for detecting the total bottle length. The other photo detector is positioned on the same plane as the first photo detector at a position above the base plate of the conveyor so as to detect the body of the bottle but avoid detecting the neck of the bottle. Both photo detectors provide a corresponding change in output when a bottle or part thereof is detected When a neck leading bottle advances into the detection zone one photo detector will provide a change in output (due to detecting the leading neck) before the other photo detector detects the body of the bottle. This will provide a time difference in the change in output between the two photo detectors. When a base leading bottle advances into the detection zone the change in state of both photo detectors will be almost simultaneous.

This time differential may be sensed in a sensing/switching device and when the time differential between the change in state of the outputs of the two photo detectors is substantially zero (indicating a base leading bottle is approaching the bottle handling mechanism) the bottle trip mechanism is positioned in the path of the base leading bottle. If the time differential between the change of state of the outputs of the photo detectors exceeds at least some minimum time, (indicating a neck leading bottle) the sensing/switching device causes the bottle trip mechanism to recede or retract below the path of the oncoming neck leading bottle. Preferably a double acting device such as a dual acting solenoid is operated one way or another by the sensing/switching device so as to pivotally elevate and/or retract the bottle trip mechanism into and out of the path of the oncoming bottle, in accordance with the orientation of the bottle detected by the bottle position sensing devices.

It has been found that the most efficient mechanism for orientation of a base leading bottle is a bottle trip placed in the path of a base leading bottle. It has also been found that the most efficient mechanism for orientation of a neck leading bottle is an upward moving surface placed in the path of a neck leading bottle. This invention permits both of these most favorable mechanisms to be used selectively in the same system by sensing which type of bottle is advancing to be oriented and then selectively setting up or preparing the bottle stand up apparatus to act upon the bottle, using the most efficient means found for that particular bottle.

Another advantage of the present invention is that the structure of the apparatus for acting upon a base leading bottle and the structure for acting upon a neck leading body are independent of each other and therefore may be designed for maximum efficiency for a particular bottle part, either bottle base of bottle neck engagement. Such independent structural configuration provides great flexibility in design parameters which is particularly important in high speed applications wherein minor dimensional differences become very important.

Further, relative placement of the bottle position detection sub-system, the trip of the bottle trip mechanism, and the rotating wheel with respect to each other is fully adjustable so that any size bottle may be accommodated. Further, the rotational speed and the level of the rotating wheel surface above the base of the conveyor is also fully adjustable, and may be a factor of size of the bottle.

It is therefore an object of the present invention to provide a bottle stand up apparatus which is capable of maximum efficiency in handling both base leading and neck leading bottles.

Another object is to provide apparatus for orienting bottles from a lying down position to an upright position which operates independently on a base leading bottles and neck leading bottles.

A further object is to provide bottle upright orienting apparatus which is easily and quickly adjusted for bottle characteristics. These and other objects will become more apparent from reading the following description of the invention with reference to the drawings.

BRIEF DESCRIPTION OF THE DRAWINGS

FIG. 3 is a representation, in side view, of bottles in a conveyor system approaching the uprighting orientation apparatus in base leading alignment;

FIG. 3a is a presentation, in plan view, of FIG. 3

FIG. 3b represents a in or rod trip mechanism.

FIG. 4 is a cross-section view at line 4—4 of FIG. 2a;

FIG. 5a is a representation of the reaction of the photo-cells to detection of a neck-leading bottle; and FIG. 5b is a representation of the reaction of the photo-cells to detection of a base leading bottle.

DETAILED DESCRIPTION OF THE INVENTION

Figure 1:
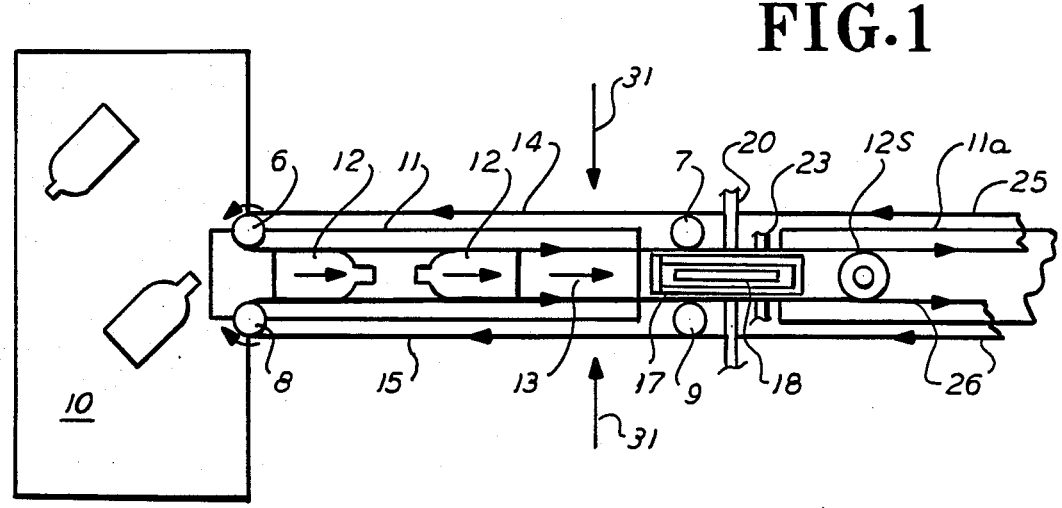
FIG. 1 is a representation, of part of a bottle conveyor system employing the present invention.

FIG. 1 is a plan view of a representation of part of a conveyor system in which bottles, such as plastic or glass bottles, are loaded on to a platform 10 and are introduced into the conveyor system in a lying down position. Bottles 12 are fed into the moving elements in either neck leading or base leading orientation. In many bottle conveyor systems the bottles must be positioned upright, that is, standing on their bases in order to be filled or labeled. Thus it is often the first function of a conveyor to orient the moving bottles to an upright condition, standing on the base of the bottle.

In the preferred embodiment of the invention, bottles 12 are introduced between opposing moving belts 14 and 15 from a loading platform 10, the bottles supported by a base plate 11. The belts are driven around the pulley wheels 6 and 7 and 8 and 9, by a drive, not shown. The bottles are gripped by the moving belts and are carried or driven, in a lying down position, along a path parallel to the major axis of the bottle. The bottles are carried in the direction of the arrows 13. The distance between the side belts 14 and 15 is adjustable and is made preferably substantially equal to the smaller cross-sectional diameter of the bottle body, whether the bottle is oval or rectangular.

Downstream from the platform 10, in the path of the bottles, is a retractable bottle trip 17 and a rotating wheel 18. The width of the trip 17 is slightly less than the distance between the working surfaces of the belts 14 and 15. The bottle trip 17 is slotted so that the rotating wheel 18 may be located centrally in the path of the oncoming bottles. The wheel 18 is supported on a drive shaft 20 while the bottle trip 17 is supported on a shaft 23. As will be described below, the shaft 23 serves as a fulcrum on which the retractable bottle trip pivots up into and down away or out of the path of the bottles on the conveyor.

The bottles 12 pass through the bottle stand up assembly and are acted upon by the bottle stand up assembly in cooperation with the drive belts. The bottles are oriented into a stand up position, standing on the base of the bottle as represented by bottle 12s. The bottle 12s is carried by belts 25 and 26 along the plate 11a to be further processed.

Upstream from the bottle stand up assembly is a bottle position detector represented by the arrows 31. This bottle position detector senses the position of the bottle whether base leading (BL) or neck leading (NL) and prepares or sets up the bottle stand up assembly to act on the approaching bottle, according to the position (either BL or NL) of the bottle.

The rotating wheel 18, located in the open or slotted area of the bottle trip 17 has a width which is approximately the same as the diameter of the neck of the bottle to be oriented. The wheel 18 is rotated on an axle drive or drive shaft 20 by a drive, not shown. The speed of rotation is adjustable and is preferably of a speed so that the surface of the wheel is at approximately the same speed as and in some cases faster than the speed of the belts 15 and 14.

The position or height of the wheel 18 relative to the base plate 11 is adjustable and preferably extending above the surface of the base plate 11. The wheel 18 on the axle 20 is interchangeable so that the bottles of different sizes may be accommodated.

Through the use of a bottle position detector, as will be described below, the orientation of the bottle, either neck leading or base leading, when it is introduced into the drive from the platform is no longer a factor of concern since the bottle position detector detects the orientation o the bottle and signals the bottle orientation apparatus, effectively preparing or setting up the apparatus to work or act on a particularly oriented bottle. This is command operation according to bottle orientation.

Figure 2:
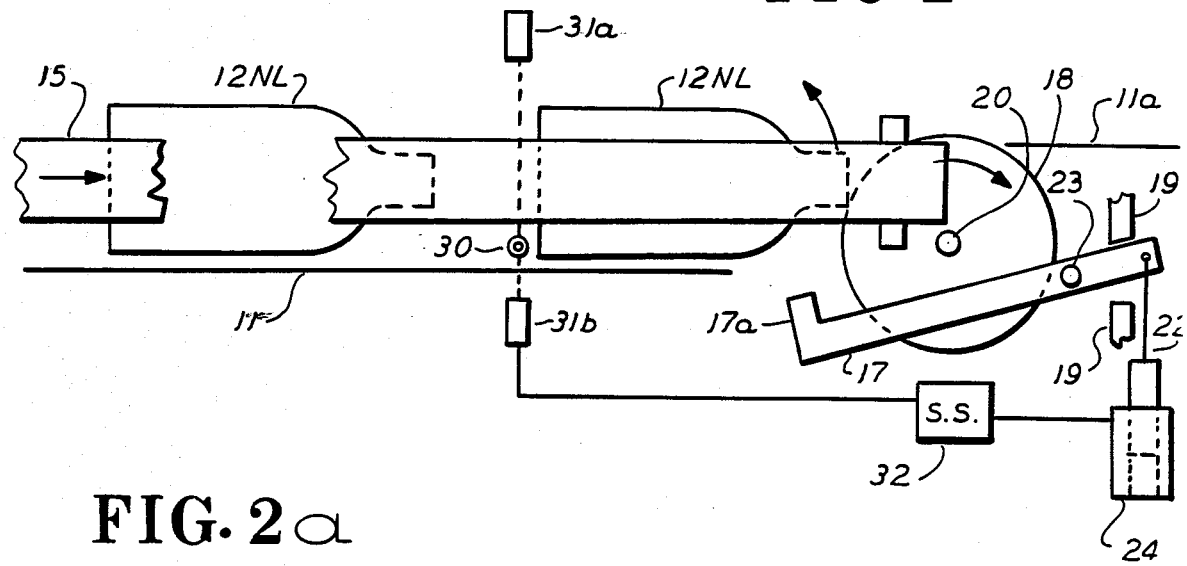
FIG. 2 is a representation, in side view, of bottles in a conveyor system approaching the uprighting orientation apparatus in neck leading alignment.
Figure 2A:
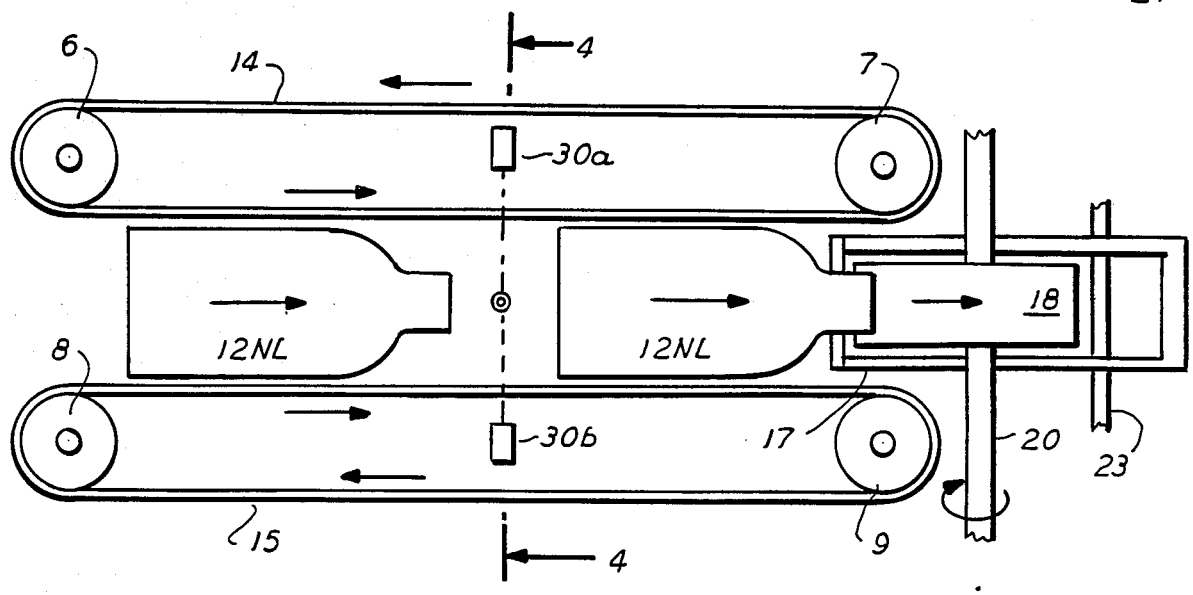
FIG. 2a is a representation in plan view of FIG. 2.

Referring to FIGS. 2 and 2a, as the bottle 12 NL approaches the righting apparatus the neck of the bottle passes over the retracted trip 17a of the bottle trip 17 and engages the rotating wheel 18. The belts 14 and 15 drive the bottle forward and the rotating wheel 18 provides a lifting action, exerted on the neck, lifting the bottle in an upward arc, a counterclockwise direction, when the bottle is traveling from left to right, as assumed in FIGS. 2 and 2a.

The bottles 12NL are conveyed forward, by the belts 14 and 15 during the uprighting operation. At the top of the wheel 18, the standing bottle may be secured by another set of belts represented by 25 and 26 (FIG. 1), the bottle to be conveyed to subsequent operations or processing.

Referring to FIGS. 3 and 3a, bottles 12BL are represented and are secured for travel between belts 14 and 15, moving toward the retractable bottle trip 17 and rotating wheel 18. The base of the bottle 12BL engages the elevated trip 17a since the wheel 18 is somewhat behind or downstream of the trip 17a.

The retractable bottle trip 17 includes a slotted arm 17b, in which the rotating wheel 18 is located, and a trip 17a which, when elevated into an operating condition extends somewhat above the base of the bottle. The arm 17b is mounted on a shaft or fulcrum 23, on which the retractable bottle trip 17 pivots. The trip 17a is moved into and out of operating position by operation of a solenoid 24 connected by linkage 22 to the arm 17b, on the short side of the fulcrum point.

In FIG. 2 the bottle trip 17 is represented in retracted position with the trip 17a removed to a position below the path of the bottle 12NL. This is seen with solenoid 24 having its ram extending upward and the short side of arm 17b raised against the stop 19a.

In FIG. 3 the bottle trip 17 is represented in forward or operating position with the trip 17a elevated, positioned in the path of and ready to intercept the base of the oncoming bottle 12BL.

When the bottle trip 17 is in elevated position, as represented in FIGS. 3 and 3a, the trip 17a is positioned in the path of the oncoming bottle such that the base of the bottle adjacent to the plate 11 strikes the trip 17a. The trip 17a stalls the forward movement of that part of the bottle base. The belts 14 and 15 carry the bottle forward and the base being stalled by the trip 17a, the bottle pivots about the stalled part of the bottle in a clockwise direction, (as represented in FIGS. 3 and 3a ) and the bottle stands up on its base. During part of the arcing travel of the bottle, the base of the bottle contacts the surface of the rotating wheel 18 which acts as a support. At the top of the wheel 18 the standing bottle may be grasped by another set of moving belts, represented by 25 and 26 in FIG. 1, which assist in placing the standing bottle on a moving conveyor for transfer to subsequent operations or processing.

The exit ramp 11a may be a slide or moving surface. Guide means, well known in the art may be used to insure the stability of the up righted, standing bottle when the bottle is stood on the exit ramp.

Upstream from the bottle orientation apparatus, located off the path of the bottles approaching the orientation apparatus is a bottle position detector. The bottle position detector is represented as 30a/30b and 31a/31b in FIGS. 2, 2a, 3, 3a and 4. The bottle position detector preferably includes at least two sensors which sense the presence of a bottle or a part thereof. One sensor is positioned to detect the bottle at its center line. The other sensor is positioned to detect the bottle off its center line so as to avoid detecting the neck of the bottle but yet detect the body of the bottle. Both sensors are positioned so as to detect particular parts of the bottle passing the same spot or passing through the same plane.

A preferred position of the sensors in the bottle position detection sub-system is represented in FIG. 4. Here it is seen that the sensor represented by the arrows 31a/31b is positioned on the center line of the bottle and will detect the neck and body of the bottle carried by the belts 14 and 15. It will be seen that the sensor represented by the arrows 30a/30b is positioned off the center line of the bottle, adjacent to the surface of the plate 11 so that the sensor 30a/30b will avoid contact with the neck of the bottle but will make contact with or sense the body of the bottle, as the bottle passes along the conveyor.

By positioning the sensors so that the sensors look at spots on the same plane, the orientation, either neck leading or base leading, of the bottle may be detected by a change in state or output of the detectors or sensors, such as represented in FIGS. 5a and 5b.

In FIG. 5a the line t represents time, the line 40 represents the output of sensor 31 and the line 41 represents the output of sensor 30. As represented, the outputs 40 and 41 change at different times. This is caused by one sensor 31 detecting a part of a bottle (the neck) as it passes through a plane before the second sensor 30 detects or picks up another part of the same bottle (the body) as it passes through the same plane.

The signals 40 and 41 from the sensors are applied to a selector switch 32, which may include a timer and/or differentiator set up for detecting time difference in incoming signals operate the switch so as to activate the solenoid 24 to drop the bottle trip mechanism to a position below the path of the bottle, as seen in FIG. 2a.

FIG. 5b represents that the outputs of both detectors 30 and 31 change at substantially the same time 40a and 41a indicating that both sensors detected the passing bottle at substantially the same time. This indicates that the bottle is in base leading condition.

In response to signal changes where there is virtually no time difference between the changes, the selector switch 32 will drive the solenoid 24 to pull the arm 17b down against stop 19b thereby elevating the trip 17a into position to intercept the bottle 12 proceeding along the conveyor and act upon the bottle by stalling the bottom of the base of the bottle.

In the preferred embodiment the sensors are photosensitive cells or electric eyes that change the state of their outputs when a bottle or a part thereof pass the detection point. Other sensing techniques may be used, as desired.

Although the trip mechanism 17a is shown in the form of a bar or block and the bottle trip mechanism is levered into and out of position, another form of trip mechanism, such as a pin or rod may be lifted or dropped into and out of the path of the oncoming bottle (see FIG. 3b). Here a solenoid may be used directly to position the pin or rod trip as opposed to levering the bottle trip mechanism into and out of operating position.

Although a rotating wheel is preferred in lifting, in counter clockwise direction, a neck leading bottle, an inclined belt or pair of belts may also be used, if desired.

In the event that the bottles processed on the conveyor have a neck which is off center, two sensors may be substituted for the one sensor in center line sensing position. Either of these sensors may be actuated by the neck of a neck leading bottle but both would be activated (a total of three instantaneous signals) by a base leading bottle.

Thus there has been shown and described a command bottle orientation apparatus for uprighting both neck leading and base leading bottles in a conveyor system in which the apparatus is highly and individually adjustable to the extent that the apparatus performing one operation may be adjusted without adverse effect on apparatus performing another operation. Although a preferred embodiment of the invention has been represented and described and other forms suggested, other changes and modifications may be made, as will become apparent to those skilled in the art after this disclosure is made, without departing from the concept and principals of the invention.

What is claimed is:

1. Bottle orientation apparatus for uprighting each bottle of a plurality of bottles from a lying down position to a standing position, standing on its base, whether a bottle is in neck leading or base leading lying down position, said bottle orientation apparatus comprising:
    (a) Grasping means for grasping each bottle of said plurality of bottles and conveying each said bottle along a path in a direction parallel to an axis extending between the neck and the base of said bottle, each said bottle following behind the bottle in front of it;
    (b) a bottle trip means selectively positionable into and out of said path along which each said bottle is conveyed, said bottle trip means cooperating with said grasping means for stalling a portion of said bottle when said bottle is conveyed in a base leading lying down position, said bottle being pivoted on a part of its base at a point of said stalling for uprighting said bottle to a standing position, standing on its base;
    (c) rotating wheel means positioned in the path of conveyance of each said bottle and having a portion of the perimeter of said rotating wheel means extending into the path of conveyance of each said bottle, said rotating wheel means coacting with said grasping means for lifting the neck of said bottle conveyed along said path in a neck leading lying down position, said last mentioned bottle being arcuately moved from a lying down position to an upright position, standing on its base; and
    (d) means for detecting the position of each bottle individually while in said grasping means but before coming in contact with said trip means for determining whether the detected bottle is in a neck leading or base leading orientation.

2. Bottle orientation apparatus as in claim 1 and in which said means for detecting provides a first output for indicating the detected bottle is in a neck leading position and provides a second output for indicating the detected bottle is in a base leading orientation.

3. Bottle orientation apparatus as in claim 2 and in which said apparatus further includes:
    (a) means responsive to said first output for retracting said bottle trip means for removing said bottle trip means from the path of the detected bottle; and
    (b) means responsive to said second output for inserting said bottle trip means into the path of the detected bottle.

4. Bottle orientation apparatus as in claim 2 and further including: means responsive to said first output for removing said bottle trip means from the path of the detected bottle.

5. Bottle orientation apparatus as in claim 1 and in which said means for grasping is a pair of spaced belt means spaced for securely grasping said bottles.

6. Bottle orientation apparatus as in claim 5 and in which said bottle trip means is a bar having length, width, and thickness and said length is less than the distance between said spaced belt means and said defines the height of said bar extending into the path of the detected bottle.

7. Bottle orientation apparatus as in claim 1 and in which said bottle trip means includes:
    (a) an arm mounted on a shaft means serving as a fulcrum;
    (b) a bar positioned at the end of said arm and adapted to interfere with the travel of a bottle when the arm is pivoted on said shaft so as to lift said bar into the path of the detected bottle; and
    (c) means acting upon said arm for elevating a portion of said arm for lifting said bar into the path of the detected bottle.

8. Bottle orientation apparatus as in claim 1 and in which said rotating wheel means is positioned downstream, in the direction of travel of said bottles, from said bottle trip means.

9. A bottle conveyor system having a bottle stand up apparatus integrated into said bottle conveyor system for uprighting each bottles individually as each bottle progresses along said conveyor system whether the bottle is in neck leading lying position or base leading lying position, said system including:

(a) means for introducing a plurality of bottles, one at a time, to a bottle moving means, each bottle of said plurality of bottles in a lying down position, said bottle moving means including a pair of spaced belts adapted to grasp said bottle between said spaced belts and to move said bottle along the predetermined path, with a major axis of said bottle in a plane parallel to said path when said bottle is in a lying down position;

(b) detection means positioned along said predetermined path for detecting said bottle as said bottle passes through a predetermined point along said predetermined path and for determining whether the bottle is in neck leading or base leading position and for providing a first signal when the detected bottle is in neck leading position and a second signal when the detected bottle is in a base leading position;

(c) actuatable means adapted to be actuated into a first position and a second position connected for receiving signals from said detection means and for assuming said first position in response to receiving said first signal and assuming said second position in response to receiving said second signal;

(d) bottle trip means, selectively positioned in said predetermined path when said actuatable means assumes said second position and, when in said predetermined path for coacting with said pair of spaced belts for uprighting base leading bottles from a lying down position to a standing upright position, standing on its base and when said actuatable means assumes said first position to be positioned below said predetermined path; and (e) inclined moving means positioned in said predetermined path and co-acting with said pair of spaced belts for uprighting neck leading bottles from a lying down position to a standing upright position, standing on its base.

10. A bottle conveyor system, as in claim 9 and in which said detection means includes a first detector and a second detector, each adapted to detect the presence of a bottle, or a part thereof, as the bottle passes through the same plane along said predetermined path and said first detector is adapted to detect the bottle when the center line of said bottle passes through said same plane and said second detector is adapted to detect the bottle when a portion of the bottle, off the center line of said bottle, passes through said same plane.

11. A bottle conveyor system as in claim 9 and in which said bottle trip means includes a bottle stop means adapted to be elevated into said predetermined path and to stall a portion of said bottle while co-acting with said pair of belts which belts carry the remainder of said bottle forward such that said bottle pivots about the stalled portion, and said bottle is uprighted.

12. A bottle conveyor system as in claim 11 and said bottle stop means is a block.

13. A bottle conveyor system as in claim 11 and said bottle stop means is a rod.

14. A bottle conveyor system as in claim 10 and in which said first detector is a photo-sensitive device.

15. A bottle conveyor system as in claim 10 and in which said first detector is an electric eye device.

16. A bottle conveyor system as in claim 10 and in which the off the center line portion of the bottle is a portion of the body of the bottle along the side on which the bottle is lying at the time the bottle is detected.

17. Apparatus for use in a bottle conveyor for uprighting bottles from a lying down position to a standing position while the bottles are moving along a predetermined path on a bottle conveyor, whether the bottles are in neck leading orientation or base leading orientation, said apparatus comprising:

(a) a pair of spaced endless belts adapted to grasp each bottle introduced in said bottle conveyor between said belts and carry each said bottle along said predetermined path at a predetermined speed;

(b) means for detecting each bottle individually as the detected bottle passes through a predetermined point along said predetermined path and for determining whether the detected bottle is oriented in neck leading or base leading position;

(c) a bottle trip means responsive to said means for detecting, and positionable below said predetermined path when said detecting means determines that the detected bottle is neck leading oriented and positionable in said predetermined path when said detecting means determines that the detected bottle is oriented in base leading position;

(d) a rotating wheel positioned, at least in part, in said predetermined path and rotating so that the surface of said rotating wheel in said predetermined path is traveling in the same direction as the bottle moving along said predetermined path and at or in excess of said predetermined speed;

(e) said bottle trip means for cooperating with said pair of spaced endless belts when said bottle trip means is positioned in said predetermined path for acting upon a detected bottle oriented in base leading position for causing said bottle to pivot about a portion of its base and to come upright, standing on its base; and (f) said rotating wheel means for cooperating with said pair of spaced belts for acting upon a detected bottle oriented in neck leading position for causing the neck portion of said bottle to elevate said bottle and to come upright, standing on its base.

18. Apparatus as in claim 17 and in which said means for detecting includes at least a first detector and a second detector, each detecting a different portion of the same bottle as the bottle passes through a plane.

19. Apparatus as in claim 17 and in which said bottle trip means includes at least an arm mounted on a fulcrum and a bottle base stop mounted on an end of said arm and means for pivoting said arm about said fulcrum for positioning said bottle base stop in said predetermined path and for pivoting said arm about said fulcrum for positioning said bottle base stop below said predetermined path.

20. Apparatus as in claim 19 and in which said means for pivoting includes a double acting solenoid coupled to said arm for levering said arm about said fulcrum.

21. Apparatus as in claim 17 and in which said rotating wheel is mounted on a drive shaft and said rotating wheel is removable therefrom for replacing said rotating wheel so that the wheel used is comparable in size with the bottles on said conveyor.

* * * * *